United States Patent
Woo et al.

(10) Patent No.: US 11,551,874 B2
(45) Date of Patent: *Jan. 10, 2023

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Seok Kyoon Woo, Suwon-si (KR); Kyoung Jin Cha, Suwon-si (KR); Jeong Ryeol Kim, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,860

(22) Filed: Dec. 3, 2020

(65) Prior Publication Data
US 2021/0090812 A1    Mar. 25, 2021

Related U.S. Application Data

(63) Continuation of application No. 16/206,858, filed on Nov. 30, 2018.

(30) Foreign Application Priority Data

Oct. 17, 2018  (KR) .......................... 10-2018-0123984

(51) Int. Cl.
*H01G 4/30* (2006.01)
*H01G 4/008* (2006.01)
*H01G 4/12* (2006.01)

(52) U.S. Cl.
CPC .............. *H01G 4/30* (2013.01); *H01G 4/008* (2013.01); *H01G 4/1227* (2013.01)

(58) Field of Classification Search
CPC ........ H01G 4/30; H01G 4/232; H01G 4/2325; H01G 4/12; H01G 4/008
See application file for complete search history.

(56) References Cited

U.S. PATENT DOCUMENTS 6,342,732 B1   1/2002  Ochiai et al.
7,368,070 B2   5/2008  Akimoto et al.
(Continued)

FOREIGN PATENT DOCUMENTS

CN     1700361 A    11/2005
CN     103370755 A  10/2013
(Continued)

OTHER PUBLICATIONS

Advisory Action issued in corresponding U.S. Appl. No. 16/206,858 dated Feb. 24, 2021.
(Continued)

*Primary Examiner* — Imran Akram
(74) *Attorney, Agent, or Firm* — Morgan, Lewis & Bockius LLP

(57) ABSTRACT

A method of manufacturing a multilayer ceramic electronic component includes preparing a ceramic green sheet, forming an internal electrode pattern by applying a paste for an internal electrode including a conductive powder to the ceramic green sheet, forming a ceramic laminate structure by layering the ceramic green sheet on which the internal electrode pattern is formed, forming a body including a dielectric layer and an internal electrode by sintering the ceramic laminate structure, and forming an external electrode by forming an electrode layer on the body, and forming a conductive resin layer on the electrode layer, and the (Continued)

conductive powder includes a conductive metal and tin (Sn), and a content of tin (Sn) is 1.5 wt % or higher, based on a weight of the conductive metal.

11 Claims, 7 Drawing Sheets

(56) References Cited

U.S. PATENT DOCUMENTS

| | | | |
|---|---|---|---|
| 9,099,244 B2 | 8/2015 | Suzuki et al. | |
| 9,706,641 B1* | 7/2017 | Park | H01G 4/30 |
| 9,959,975 B2 | 5/2018 | Inoue et al. | |
| 2001/0055193 A1* | 12/2001 | Chazono | H01G 4/1209 |
| | | | 361/311 |
| 2002/0001712 A1* | 1/2002 | Higuchi | H01G 4/232 |
| | | | 428/209 |
| 2004/0256603 A1 | 12/2004 | Celik et al. | |
| 2005/0219789 A1 | 10/2005 | Akimoto | |
| 2007/0128794 A1* | 6/2007 | Kusano | H01G 4/2325 |
| | | | 257/314 |
| 2007/0242416 A1* | 10/2007 | Saito | H01G 4/2325 |
| | | | 361/321.1 |
| 2008/0283283 A1* | 11/2008 | Abe | H01G 4/206 |
| | | | 427/79 |
| 2008/0310073 A1* | 12/2008 | Kanno | C04B 35/4682 |
| | | | 361/301.3 |
| 2009/0139754 A1* | 6/2009 | Ikarashi | H01C 1/148 |
| | | | 174/257 |
| 2011/0285498 A1* | 11/2011 | Yoneda | H01C 1/144 |
| | | | 338/306 |
| 2012/0135563 A1* | 5/2012 | Lien | H01C 7/112 |
| | | | 257/E21.004 |
| 2012/0288731 A1* | 11/2012 | Motoki | C23C 28/021 |
| | | | 428/648 |
| 2013/0321980 A1 | 12/2013 | Suzuki et al. | |
| 2014/0002951 A1 | 1/2014 | Takeoka | |
| 2014/0002955 A1 | 1/2014 | Takeoka | |
| 2014/0049874 A1 | 2/2014 | Lee et al. | |
| 2014/0321025 A1* | 10/2014 | Saito | H01G 4/232 |
| | | | 205/181 |
| 2015/0030830 A1 | 1/2015 | Adachi et al. | |
| 2015/0090483 A1* | 4/2015 | Moon | H01G 4/30 |
| | | | 174/260 |
| 2015/0155098 A1 | 6/2015 | Yamaguchi et al. | |
| 2015/0279566 A1* | 10/2015 | Otani | H01G 4/30 |
| | | | 361/301.4 |
| 2016/0027561 A1* | 1/2016 | Inoue | H01G 4/30 |
| | | | 338/20 |
| 2016/0027583 A1* | 1/2016 | Ahn | H01G 4/12 |
| | | | 361/301.4 |
| 2016/0118188 A1 | 4/2016 | Wada | |
| 2016/0230026 A1 | 8/2016 | Furusawa et al. | |
| 2017/0223832 A1* | 8/2017 | Chung | H05K 3/321 |
| 2018/0130601 A1 | 5/2018 | Kim et al. | |
| 2018/0144863 A1* | 5/2018 | Kim | C01B 32/182 |

FOREIGN PATENT DOCUMENTS

| | | |
|---|---|---|
| CN | 104837580 A | 8/2015 |
| CN | 105612014 A | 5/2016 |
| JP | H11-162771 A | 6/1999 |
| JP | 2004-221304 A | 8/2004 |
| JP | 2005-281712 A | 10/2005 |
| JP | 2013-170303 A | 9/2013 |
| JP | 2016-031989 A | 3/2016 |
| KR | 10-0950127 B1 | 3/2010 |
| KR | 10-2015-0036428 A | 4/2015 |
| KR | 10-2018-0051760 A | 5/2018 |

OTHER PUBLICATIONS

Non-Final Office Action dated Jul. 14, 2020 in U.S. Appl. No. 16/206,858.
Final Office Action dated Nov. 13, 2020 in U.S. Appl. No. 16/206,858.
Chinese Office Action dated Jun. 13, 2022, issued in corresponding Chinese Patent Application No. 202110191286.6 (with English translation).
Chinese Office Action dated Jun. 8, 2022, issued in corresponding Chinese Patent Application No. 201910193560.6 (with English translation).

* cited by examiner

MULTILAYER CERAMIC ELECTRONIC COMPONENT AND METHOD OF MANUFACTURING THE SAME

CROSS-REFERENCE TO RELATED APPLICATION(S)

This application is a continuation of U.S. patent application Ser. No. 16/206,858 filed Nov. 30, 2018, which claims the benefit of priority to Korean Patent Application No. 10-2018-0123984 filed on Oct. 17, 2018 in the Korean Intellectual Property Office, the disclosures of each are incorporated herein by reference in their entirety.

TECHNICAL FIELD

The present disclosure relates to a multilayer ceramic electronic component and a method of manufacturing the same.

BACKGROUND

Generally, electronic components using ceramic materials such as a capacitor, an inductor, a piezoelectric device, a varistor or a thermistor may include a body formed of a ceramic material, an internal electrode formed in the body, and an external electrode disposed on a surface of the body to be connected to the internal electrode.

Among multilayer ceramic electronic components, a multilayer ceramic capacitor may include a plurality of layered dielectric layers, internal electrodes opposing each other with a single dielectric layer interposed therebetween, and external electrodes electrically connected to the internal electrodes.

A multilayer ceramic capacitor has been used as a component of mobile communication devices such as computers, PDAs, mobile phones, and the like, as a multilayer ceramic capacitor is small-sized, can secure high capacity and can be easily installed.

There has been increased interest in electrical components, and multilayer ceramic capacitors used in an electrical industry, such as multilayer ceramic capacitors used in vehicles or in infotainment systems, have been required to have high reliability and high internal voltage properties.

To secure high reliability and high internal voltage properties, it may be necessary to prevent discontinuity and conglomeration of an internal electrode and improve connectivity of an internal electrode.

To address the issue, the method of dispersing an inhibitor (a ceramic material for delaying the sintering of a conductive powder) in a paste for an internal electrode and delaying the sintering of a conductive powder has been developed. However, the method has a local issue dependent on the dispersion state of the inhibitor, and a significantly large amount of an inhibitor and an organic material may need to be added to sufficiently obtain an expected effect.

Also, residues of organic materials used to implement strength of a sheet may become malignant carbon residues (crystallized carbon residues) during a sintering process, which may lead to the conglomeration of electrodes, unevenly sintered dielectric layers, and the like.

Thus, it has been necessary to develop the method which can address the problems of discontinuity and conglomeration of an internal electrode while preventing the creation of carbon residues without the problem of dispersion, and the like.

SUMMARY

An aspect of the present disclosure may provide a method of manufacturing a multilayer ceramic electronic component having high reliability and high internal voltage properties by preventing discontinuity and conglomeration of an internal electrode while preventing creation of carbon residues without the problem of dispersion, and the like.

According to an aspect of the present disclosure, a method of manufacturing a multilayer ceramic electronic component includes preparing a ceramic green sheet, forming an internal electrode pattern by applying a paste for an internal electrode including a conductive powder to the ceramic green sheet, forming a ceramic laminate structure by layering the ceramic green sheet on which the internal electrode pattern is formed, forming a body including a dielectric layer and an internal electrode by sintering the ceramic laminate structure, and forming an external electrode by forming an electrode layer on the body, and forming a conductive resin layer on the electrode layer. The conductive powder includes a conductive metal and tin (Sn), and a content of tin (Sn) is 1.5 wt % or higher, based on a weight of the conductive metal.

According to another aspect of the present disclosure, a multilayer ceramic electronic component includes a body including a dielectric layer and an internal electrode, and an external electrode including an electrode layer disposed on the body and connected to the internal electrode, and a conductive resin layer disposed on the electrode layer. The internal electrode includes a metal grain and a composite layer encapsulating the metal grain, and the composite layer includes nickel (Ni) and tin (Sn).

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
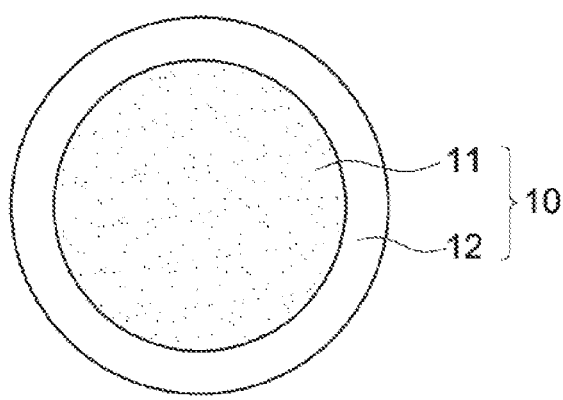
FIG. 1 is a schematic diagram illustrating a conductive powder having a core-shell structure according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

In the drawings, certain elements may be omitted to clearly describe the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

In the drawing, an X direction is a second direction or a length direction, a Y direction is a third direction or a width direction, and a Z direction is a first direction, a layering direction, or a thickness direction.

Figure 2:
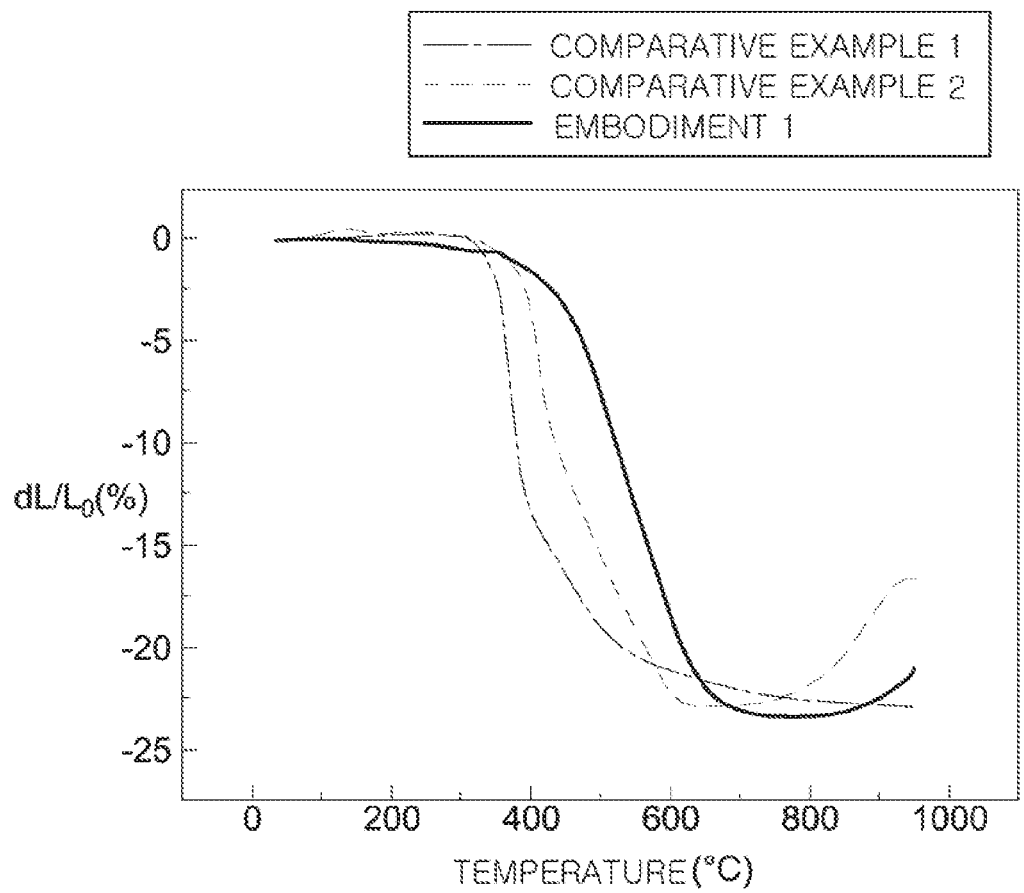
FIG. 2 is a graph illustrating a comparison of thermal contraction behaviors depending on changes in content of tin (Sn) based on a content of a conductive metal.

FIG. 1 is a schematic diagram illustrating a conductive powder having a core-shell structure according to an exemplary embodiment in the present disclosure;

FIG. 2 is a graph illustrating a comparison of thermal contraction behaviors depending on changes in content of tin (Sn) based on a content of a conductive metal.

Figure 3A:
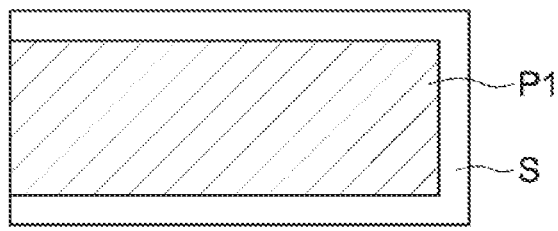
FIGS. 3A and 3B are schematic diagrams illustrating ceramic green sheets on which an internal electrode patterns are formed.
Figure 3A:
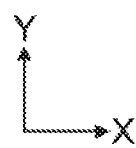
Figure 3B:
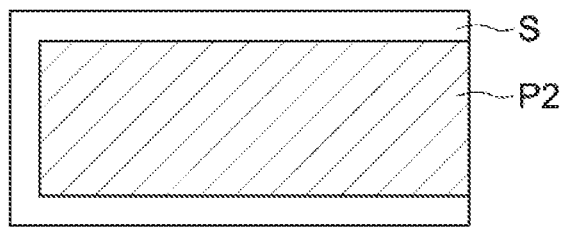
Figure 3B:
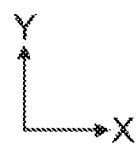

FIGS. 3A and 3B are schematic diagrams illustrating ceramic green sheets on which internal electrode patterns is formed.

Figure 4:
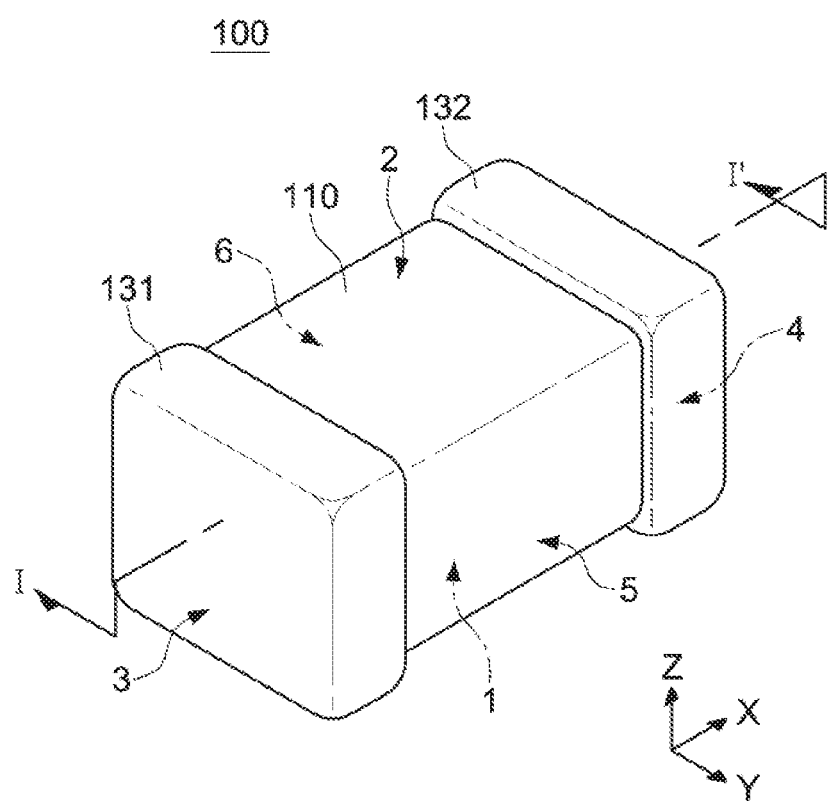
FIG. 4 is a schematic perspective diagram illustrating a multilayer ceramic electronic component manufactured by a method of manufacturing a multilayer ceramic electronic component according to an exemplary embodiment in the present disclosure.

FIG. 4 is a schematic perspective diagram illustrating a multilayer ceramic electronic component manufactured by a method of manufacturing a multilayer ceramic electronic component according to an exemplary embodiment.

Figure 5:
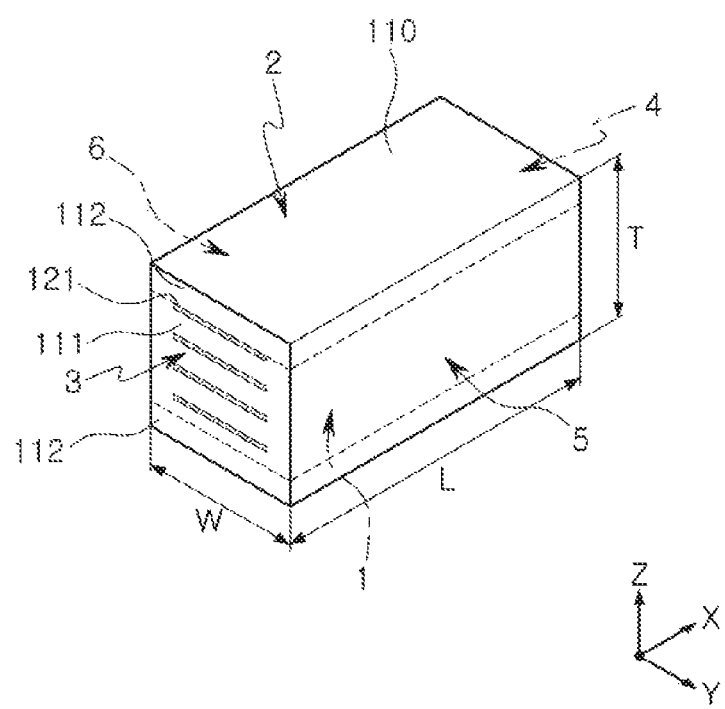
FIG. 5 is a schematic perspective diagram illustrating a body in FIG. 4.

FIG. 5 is a schematic perspective diagram illustrating a body in FIG. 4.

Figure 6:
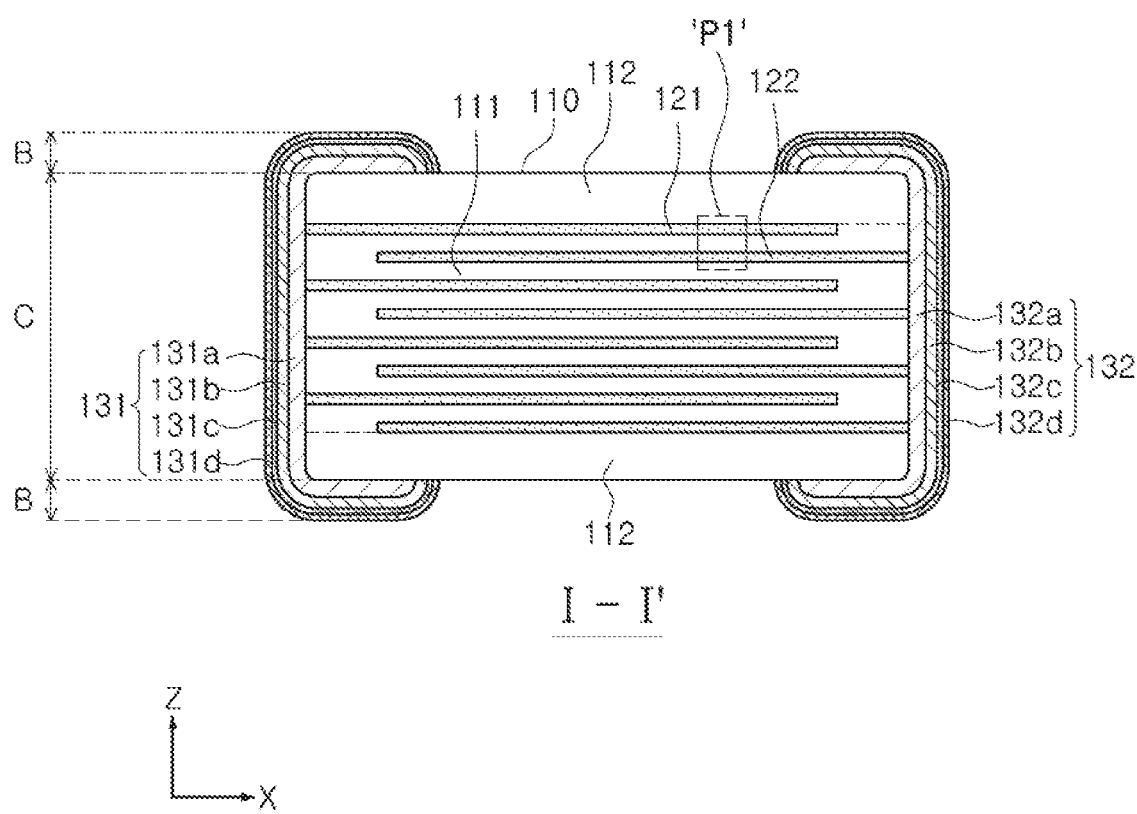
FIG. 6 is a cross-sectional diagram taken along line I-I' in FIG. 4.

FIG. 6 is a cross-sectional diagram taken along line I-I' in FIG. 4.

Figure 7:
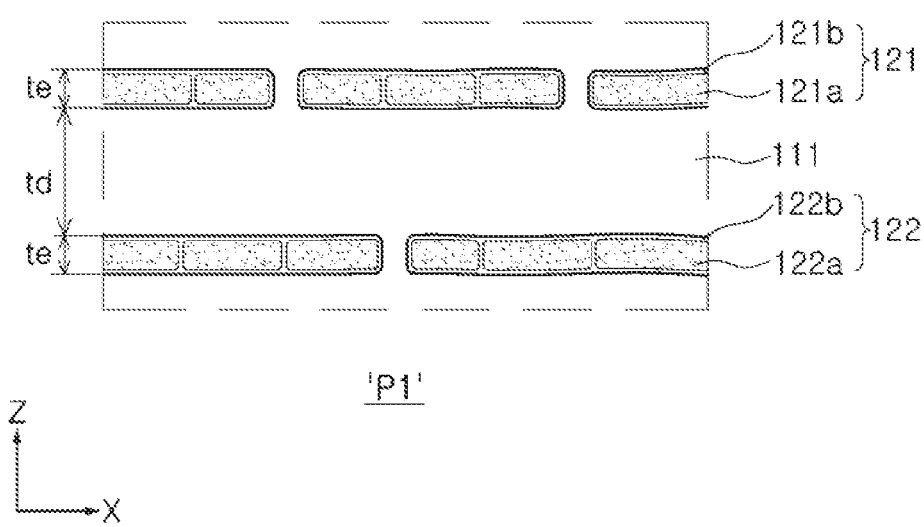
FIG. 7 is a diagram illustrating a portion P1 in FIG. 6 in magnified form.

FIG. 7 is a diagram illustrating a portion P1 in FIG. 6 in magnified form.

In the descriptions below, a method of manufacturing a multilayer ceramic electronic component and a multilayer ceramic electronic component manufactured by the method will be described in greater detail in accordance with an exemplary embodiment with reference to FIGS. 1 to 7.

Method of Manufacturing Multilayer Ceramic Electronic Component

A method of manufacturing a multilayer ceramic electronic component may include preparing a ceramic green sheet, forming an internal electrode pattern by applying a paste for an internal electrode including a conductive powder to the ceramic green sheet, forming a ceramic laminate structure by layering the ceramic green sheet on which the internal electrode pattern is formed, forming a body including a dielectric layer and an internal electrode by sintering the ceramic laminate structure, and forming an external electrode by forming an electrode layer on the body, and forming a conductive resin layer on the electrode layer. The conductive powder may include a conductive metal and tin (Sn), and a content of tin (Sn) based on the conductive metal may be 1.5 wt % or higher.

Preparing Ceramic Green Sheet

A ceramic green sheet including a ceramic powder may be manufactured.

The ceramic green sheet may be a sheet having a certain thickness (μm), which may be manufactured using slurry formed from a mixture of a ceramic powder, a binder, and a solvent, and the like, and by performing a doctor blade process on the slurry. The ceramic green sheet may be sintered, and may form a dielectric layer 111 as illustrated in FIG. 6.

Forming Internal Electrode Pattern

An internal electrode pattern may be formed by applying a paste for an internal electrode including a conductive powder to the ceramic green sheet. The conductive powder may include a conductive metal and tin (Sn), and a content of tin (Sn) based on the conductive metal may be 1.5 wt % or higher.

The internal electrode pattern may be formed by a screen printing method or a gravure printing method.

Differences in sintering temperature between the paste for an internal electrode and the ceramic green sheet may cause several problems such as discontinuity of an electrode, conglomeration of an electrode, and the like. Particularly, to secure high reliability and high internal voltage properties. It may be necessary to improve connectivity of an internal electrode by preventing discontinuity and conglomeration of an internal electrode.

To address the issues above, the method of dispersing an inhibitor (a ceramic material for delaying the sintering of a conductive powder) in a paste for an internal electrode and delaying the sintering of a conductive powder has been developed. However, the method has a local issue dependent on the dispersion state of the inhibitor, and a significantly large amount of an inhibitor and an organic material may need to be added to sufficiently obtain an expected effect.

Also, residues of organic materials used to implement strength of a sheet may become malignant carbon residues (crystallized carbon residues) during a sintering process, which may cause conglomeration of electrodes, unevenly sintered dielectric layers, and the like.

The conductive powder according to the exemplary embodiment may include a conductive metal and tin (Sn), and a content of tin (Sn) based on the conductive metal may be 1.5 wt % or higher. As the conductive powder includes tin (Sn), the sintering of the conductive powder may be evenly delayed regardless of dispersion properties.

Also, if a conductive powder which does not include tin (Sn) is used, malignant carbon residues (crystallized carbon residues) may be created on an electrode surface, which look like a skein of thread, and may cause the problems of conglomeration of an electrode, unevenly sintered dielectric layers, and the like. However, according to the exemplary embodiment, the tin (Sn) may prevent conglomeration of the conductive metal, and may prevent the creation of malignant carbon residues (crystallized carbon residues), caused by the conductive powder working as a catalyst for dehydrogenation, during a sintering process.

Also, tin (Sn) may not be easily employed in a conductive powder, but may have good wet fastness properties with a conductive powder, and have a low melting point. Thus, as illustrated in FIG. 7, tin (Sn) may be melted onto surfaces of grains 121a and 122a of internal electrodes 121 and 122 during a sintering process, and form composite layers 121b and 122b including nickel (Ni) and tin (Sn), thereby preventing the grains 121a and 122a from growing.

Thus, according to the exemplary embodiment, the creation of malignant carbon residues, as well as discontinuity and conglomeration of an internal electrode may be prevented without the problem of dispersion, and the like, and a multilayer ceramic electronic component having high reliability and high internal voltage properties, and a method of manufacturing the same may be provided.

FIG. 2 is a graph illustrating a comparison of thermal contraction behaviors of a conductive powder which does not include tin (Sn) (comparative example 1), a conductive powder having tin (Sn) of 0.2 wt % based on a conductive metal (comparative example 2), and a conductive powder having tin (Sn) of 1.5 wt % based on a conductive metal (embodiment 1).

Referring to FIG. 2, the higher the content of tin (Sn) based on a conductive metal, the higher the temperature of initiation of contraction. However, in comparative example 2, a content of tin (Sn) was less than 1.5 wt %, and the temperature of contraction initiation in comparative example 2 was not significantly different from the temperature of contraction initiation in comparative example 1 which does not include tin (Sn), and an expected effect was not sufficient. In embodiment 1 in which a content of tin (Sn) based on a conductive metal was 1.5 wt %, the temperature of contraction initiation was significantly increased than in comparative example 1.

Thus, it may be desirable to configure a content of tin (Sn) based on a conductive metal to be 1.5 wt % or higher. Meanwhile, it may not be necessary to limit a maximum content of tin (Sn) based on a conductive metal. The content of tin (Sn) may be, for example, 4.0 wt % or less.

In this case, tin (Sn) may form an alloy with a conductive metal and may be included in a conductive powder in an alloy form, or may be included in a conductive powder by being coated on a surface of a conductive metal.

With respect to the configuration of coating a surface of the conductive metal with tin (Sn), referring to FIG. 1, the conductive powder may have a core-shell structure 10, and the conductive metal may be included in a core 11, and tin (Sn) may be included in a shell 12.

The shell 12 maybe formed by an atomic layer deposition process.

The atomic layer deposition (ALD) process may be used to deposit a film or a protective layer on a surface of a substrate during a semiconductor process. Differently from the method of chemically applying a film, the ALD process may grow a film by layering atomic layers one by one. The ALD process may have excellent step-coverage, a thickness of a film may be easily adjusted, and a film may be evenly formed.

By forming the shell 12 by the ALD process on a surface of the core 11, a dense and evenly coated tin (Sn) layer may be formed.

Meanwhile, the conductive powder may further include one or more materials selected from a group comprised of copper (Cu), silver (Ag), palladium (Pd), platinum (Pt), rhodium (Rh), iridium (Ir), ruthenium (Ru), and alloys thereof.

The conductive powder may also include one or more materials selected from a group comprised of tungsten (W), molybdenum (Mo), chromium (Cr), cobalt (Co) and alloys thereof.

As tungsten (W), molybdenum (Mo), chromium (Cr), cobalt (Co) have a high melting point, tungsten (W), molybdenum (Mo), chromium (Cr), cobalt (Co) may further magnify the effect of preventing the grains from growing, derived by using tin (Sn) having a low melting point.

Also, the paste for an internal electrode may further include sulfur (S) of 300 ppm or less (exclusive of 0) based on a content of the conductive powder.

Generally, a paste for an internal electrode may include sulfur (S), a material for delaying contraction. However, when a content of sulfur (S) exceeds 300 ppm, a composite layer including nickel (Ni) and tin (Sn) maybe unevenly formed after a sintering process.

Meanwhile, the conductive metal included in the conductive powder may be a nickel (Ni) powder having a melting point higher than a melting point of tin (Sn).

Forming Ceramic Laminate Structure

A ceramic laminate structure may be formed by layering a ceramic green sheet on which an internal electrode pattern is formed.

In this case, the ceramic laminate structure may be compressed by applying pressure in a layering direction.

Thereafter, the ceramic laminate structure may become a chip by cutting every area corresponding to one capacitor. In this case, the ceramic laminate structure may be cut such that one end of the internal electrode pattern is alternately exposed through a side surface. Accordingly, as illustrated in FIG. 3, the ceramic laminate structure may have a form in which a ceramic green sheet a on which an internal electrode pattern P1 becoming a first internal electrode 121 after a sintering process is formed on a ceramic green sheet 5 S, and a ceramic green sheet b on which an internal electrode pattern P2 becoming a second internal electrode 122 after a sintering process is formed on the ceramic green sheet S are alternately layered.

Forming Body

The ceramic laminate structure may be sintered to form a body including dielectric layers and internal electrodes.

The sintering process may be performed in a contraction atmosphere. Also, in the sintering process, a heating rate may be adjusted. For example, the heating rate may be within a range from 30° C./60 s to 50° C./60 s in temperature 700° C. or lower, but an example thereof is not limited thereto.

Forming External Electrode

An external electrode may be formed by forming an electrode layer on the body, and forming a conductive resin layer on the electrode layer. The electrode layer may be formed such that the electrode layer covers a side surface of the body and is electrically connected to an internal electrode exposed to the side surface of the body.

The electrode layer may be formed by applying a paste including one or more materials selected from a group comprised of copper (Cu), silver (Ag), nickel (Ni) and alloys thereof, and glass, and the conductive resin layer may be formed by applying a paste including one or more materials selected from a group comprised of copper (Cu), silver (Ag), nickel (Ni) and alloys thereof, and base resin.

Thereafter, plating layers such as a nickel (Ni) plated layer, a tin (Sn) plated layer, and the like, may be formed on the external electrode.

Multilayer Ceramic Electronic Component

A multilayer ceramic electronic component 100 manufactured by the method of manufacturing a multilayer ceramic electronic component as described above in accordance with the exemplary embodiment may include a body 110 including a dielectric layer 111 and internal electrodes 121 and 122, and external electrodes 131 and 132 including electrode layers 131a and 132a disposed on the body 110 and connected to the internal electrodes 121 and 122, and conductive resin layers 131b and 132b disposed on the electrode layers. The internal electrodes 121 and 122 may include metal grains 121a and 122a and composite layers 121b and 122b encapsulating the metal grains 121a and 122a, and the composite layers 121b and 122b may include nickel (Ni) and tin (Sn).

In the body 110, the dielectric layer 111 and the internal electrodes 121 and 122 may be alternately layered.

A shape of the body 110 may not be limited to any particular shape, but as illustrated in the diagram, the body 110 may have a hexahedral shape or a shape similar to a hexahedron. Due to contraction of a ceramic powder included in the body 110 during a sintering process, the body 110 may have substantially a hexahedral shape although the hexahedral shape may not be an exact hexahedron formed by straight lines.

The body 110 may have first and second surfaces 1 and 2 opposing each other in a thickness direction (Z direction), third and fourth surfaces 3 and 4 connected to the first and second surfaces 1 and 2 and opposing each other in a width direction (Y direction), and fifth and sixth surfaces 5 and 6 connected to the first and second surfaces 1 and 2 and the third and fourth surfaces 3 and 4 and opposing each other in a length direction (X direction).

Referring to FIG. 5, a distance between the first and second surfaces 1 and 2 may be defined as a thickness T of the body, a distance between the third and fourth surfaces 3 and 4 may be defined as a length L of the body, and a distance between the fifth and sixth surfaces 5 and 6 may be defined as a width W of the body.

The plurality of dielectric layers 111 forming the body 110 may be in a sintered state, and the dielectric layers 111 may be integrated such that boundaries between adjacent dielectric layers 111 may be difficult to identify without using a scanning electron microscope (SEM).

According to the exemplary embodiment, a material of the dielectric layer 111 may not be limited to any particular material. A material of the dielectric layer 111 may be, for example, a barium titanate material, a Perovskite material compound with lead (Pb), a strontium titanate material, or the like.

To form the material of the dielectric layer 111, various ceramic additives, organic solvents, coupling agents, dispersing agents, and the like, maybe added to the powder such as a barium titanate (BaTiO3) powder.

In this case, the multilayer ceramic capacitor 100 may include a capacitance forming portion disposed in the body 110 and forming capacitance including the first internal electrode 121 and the second internal electrode 122 disposed to oppose each other with the dielectric layer 111 interposed therebetween, and a cover portion 112 disposed on upper and lower portions of the capacitance forming portion.

The cover portion 112 may not include the internal electrodes 121 and 122, and may include the same material as the material of the dielectric layer 111. In other words, the cover portion 112 may include a ceramic material, such as a barium titanate material, a Perovskite material compound with lead (Pb), a strontium titanate material, or the like.

The cover portion 112 may be formed by disposing a single dielectric layer or layering two or more dielectric layers on upper and lower surfaces of the capacitance forming portion, respectively, and may prevent damage to an internal electrode caused by physical or chemical stress.

The internal electrodes 121 and 122 may be alternately layered with the dielectric layer, and may include first and second internal electrodes 121 and 122. The first and second internal electrodes 121 and 122 may be alternately disposed with the dielectric layer 111 forming the body 110 interposed therebetween to oppose each other, and may be exposed to the third and fourth surfaces 3 and 4 of the body, respectively.

In this case, the first and second internal electrodes 121 and 122 may be electrically separated from each other by the dielectric layer 111 interposed therebetween.

A method of printing the conductive paste may be a screen printing method, a gravure printing method, or the like. However, the method is not limited thereto.

The first and second internal electrodes 121 and 122 may include metal grains 121a and 122a, and composite layers 121b and 122b encapsulating the metal grains 121a and 122a, and the composite layers 121b and 122b may include nickel (Ni) and tin (Sn). The composite layers 121b and 122b including nickel (Ni) and tin (Sn) may be configured to almost entirely encapsulate at least one of the metal grains 121a and 122a. [0077] The metal grains 121a and 122a may be a polyhedron formed by metal atoms arranged in a regular manner. The composite layers 121b and 122b including nickel (Ni) and tin (Sn) may encapsulate the metal grains 121a and 122a. In other words, the composite layers 121b and 122b including nickel (Ni) and tin (Sn) may be disposed on grain boundaries. The composite layers 121b and 122b including nickel (Ni) and tin (Sn) may prevent the metal grains 121a and 122a from growing externally, thereby preventing discontinuity and conglomeration of an internal electrode.

When a ratio between an overall length of the internal electrode 121 and 122 and a length of a portion in which the internal electrode is formed is defined as connectivity C of the internal electrode, the connectivity C may satisfy $85 \leq 96C$ as the composite layers 121b and 122b including nickel (Ni) and tin (Sn) prevent the metal grains 121a and 122a from growing externally.

The composite layer 121b and 122b including nickel (Ni) and tin (Sn) may have a thickness ranging from 1 to 15 nm.

When a thickness of the composite layer 121b and 122b including nickel (Ni) and tin (Sn) is less than 1 nm, it may not be possible to sufficiently prevent the metal grain from growing externally, and when a thickness of the composite layer 121b and 122b including nickel (Ni) and tin (Sn) exceeds 15 nm, a thickness of the composite layer 121b and 122b may not be evenly formed. Accordingly, the effect of preventing the metal grain from growing externally may be reduced.

The metal grains 121a and 122a may be Ni grains.

The external electrodes 131 and 132 may include the electrode layers 131a and 132a disposed on the body 110 and connected to the internal electrodes 121 and 122, and the conductive resin layers 131b and 132b disposed on the electrode layers 131a and 132a.

In this case, the external electrodes 131 and 132 may further include Ni plated layers 131c and 132c disposed on the conductive resin layers 131b and 132b, and Sn plated layers 131d and 132d disposed on the Ni plated layers 131c and 132c.

The external electrodes 131 and 132 may also include the first external electrode 131 disposed on the third surface 3 of the body and the second external electrode 132 disposed on the fourth surface 4.

The first external electrode 131 may include the first electrode layer 131a connected to the first internal electrode 121 and the first conductive resin layer 131b disposed on the first electrode layer 131a.

The second external electrode 132 may include the second electrode layer 132a connected to the second internal electrode 122, and the second conductive resin layer 132b disposed on the second electrode layer 132a.

The first external electrode 131 may further include the first Ni plated layer 131c disposed on the first conductive resin layer 131b, and the first Sn plated layer 131d disposed on the first Ni plated layer 131c.

The second external electrode 132 may further include the second Ni plated layer 132c disposed on the second conductive resin layer 132b, and the second Sn plated layer 132d disposed on the second Ni plated layer 132c.

The first and second external electrodes 131 and 132 may be electrically connected to the first and second internal electrodes 121 and 122, respectively, to form capacitance, and the second external electrode 132 may be connected to a potential different from a potential of the first external electrode 131.

The electrode layers 131a and 132a may include a conductive metal and glass.

A conductive metal used to form the electrode layers 131a and 132a may not be limited to any particular material as long as the material is able to be electrically connected to the internal electrode to form capacitance. The conductive material may be one or more materials selected from a group comprised of copper (Cu), silver (Ag), nickel (Ni) and alloys thereof.

The electrode layers 131a and 132a may be formed by applying a conductive paste made by adding glass frit to a powder of the conductive metal powder, and a sintering process.

The conductive resin layers 131b and 132b may be formed on the electrode layers 131a and 132a, and may entirely cover the electrode layers 131a and 132a.

The conductive resin layers 131b and 132b may include a conductive metal and base resin.

The base resin included in the conductive resin layers 131b and 132b may not be limited to any particular material as long as the material has adhesion properties and shock absorption properties and is able to be mixed with the conductive metal powder to make a paste. The material may include epoxy resin, for example.

The conductive metal included in the conductive resin layers 131b and 132b may not be limited to any particular material as long as the material is able to be electrically connected to the electrode layers 131a and 132a. The material may include, for example, one or more materials selected from a group comprised of copper (Cu), silver (Ag), nickel (Ni) and alloys thereof.

The Ni plated layers 131c and 132c may be formed on the conductive resin layers 131b and 132b, and may entirely cover the conductive resin layers 131b and 132b.

The Sn plated layer 131d and 132d may be formed on the Ni plated layers 131c and 132c, and may entirely cover the Ni plated layers 131c and 132c.

The Ni plated layers 131c and 132c and the Sn plated layer 131d and 132d may improve connectivity and mounting properties.

The external electrodes 131 and 132 may include a connection portion C disposed on the third surface 3 or the fourth surface 4 of the body, and a band portion B extended to portions of the first and second surfaces 1 and 2 from the connection portion C.

The band portion B may also be extended to portions of the fifth and sixth surfaces 5 and 6 from the connection portion C, as well as being extended to portions of first and second surfaces 1 and 2.

FIG. 7 is a diagram illustrating a portion P1 in FIG. 6 in magnified form.

Referring to FIG. 7, in a multilayer ceramic electronic component according to an exemplary embodiment, a thickness td of a dielectric layer 111 and a thickness te of internal electrode 121 and 122 may satisfy td>2*te.

In other words, according to the exemplary embodiment, the thickness td of the dielectric layer 111 maybe greater than twice the thickness te of the internal electrode 121 and 122.

Generally, an electronic component used in a high voltage electrical component may have the issue of reliability caused by degradation of insulation breakdown voltage in a high voltage environment.

In a multilayer ceramic capacitor according to the exemplary embodiment, the thickness td of the dielectric layer 11 may be greater than twice the thickness te of the internal electrode 121 and 122, and the thickness of the dielectric layer, a distance between the internal electrodes, may be increased, thereby improving the insulation breakdown voltage properties.

When the thickness td of the dielectric layer 111 is twice the thickness te of the internal electrode 121 and 122 or less, the thickness of the dielectric layer, a distance between the internal electrodes, may be low, which may degrade the insulation breakdown voltage properties.

The thickness to of the internal electrode 121 and 122 may be less than 1 μm, and the thickness td of the dielectric layer 111 may be less than 2.8 μm, but the thicknesses may not be limited thereto.

According to the aforementioned exemplary embodiments, by forming an internal electrode using the conductive powder including tin (Sn), discontinuity and conglomeration of the internal electrode maybe prevented while preventing malignant carbon residues without the problem of dispersion, and the like.

While the exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising:
   a body comprising a dielectric layer and an internal electrode; and
   an external electrode comprising an electrode layer disposed on the body and connected to the internal electrode, and an electrically conductive resin layer disposed on the electrode layer,
   wherein the internal electrode comprises a plurality of metal grains and a composite layer disposed at a grain boundary between the plurality of metal grains,
   wherein the composite layer is additionally disposed at a boundary between the metal grains and the dielectric layer,
   wherein the composite layer comprises tin (Sn), and
   wherein the composite layer encapsulates at least one of the plurality of metal grains.

2. The multilayer ceramic electronic component of claim 1, wherein the internal electrode comprises a conductive metal, and
   a content of tin (Sn) in the internal electrode is 1.5 wt % or higher, based on a weight of the conductive metal in the internal electrode.

3. The multilayer ceramic electronic component of claim 1, wherein the composite layer has a thickness within a range of 1 to 15 nm.

4. The multilayer ceramic electronic component of claim 1, wherein 85%≤C, where C is a ratio of a length of a portion in which the internal electrode extends to an overall length of the internal electrode.

5. The multilayer ceramic electronic component of claim 1, wherein the electrode layer comprises glass and at least one material selected from the group consisting of copper (Cu), silver (Ag), nickel (Ni) and alloys thereof, and the conductive resin layer comprises a base resin and at least one material selected from the group consisting of copper (Cu), silver (Ag), nickel (Ni) and alloys thereof.

6. The multilayer ceramic electronic component of claim 1, wherein the internal electrode has a thickness of less than 1 μm, and the dielectric layer has a thickness of less than 2.8 μm.

7. The multilayer ceramic electronic component of claim 1, wherein the internal electrode has a thickness of less than 1 μm.

8. The multilayer ceramic electronic component of claim 1, wherein the dielectric layer has a thickness of less than 2.8 μm.

9. The multilayer ceramic electronic component of claim 7, wherein td>2*te, where te is a thickness of the internal electrode, and td is a thickness of the dielectric layer.

10. The multilayer ceramic electronic component of claim 1, wherein the composite layer further comprises nickel (Ni).

11. The multilayer ceramic electronic component of claim 1, wherein the metal grains include nickel (Ni) grains.

* * * * *